Mar. 3, 1925.
D. C. BEIDLER ET AL
PORTRAIT CAMERA
Filed Nov. 17, 1923
1,528,464
2 Sheets-Sheet 1
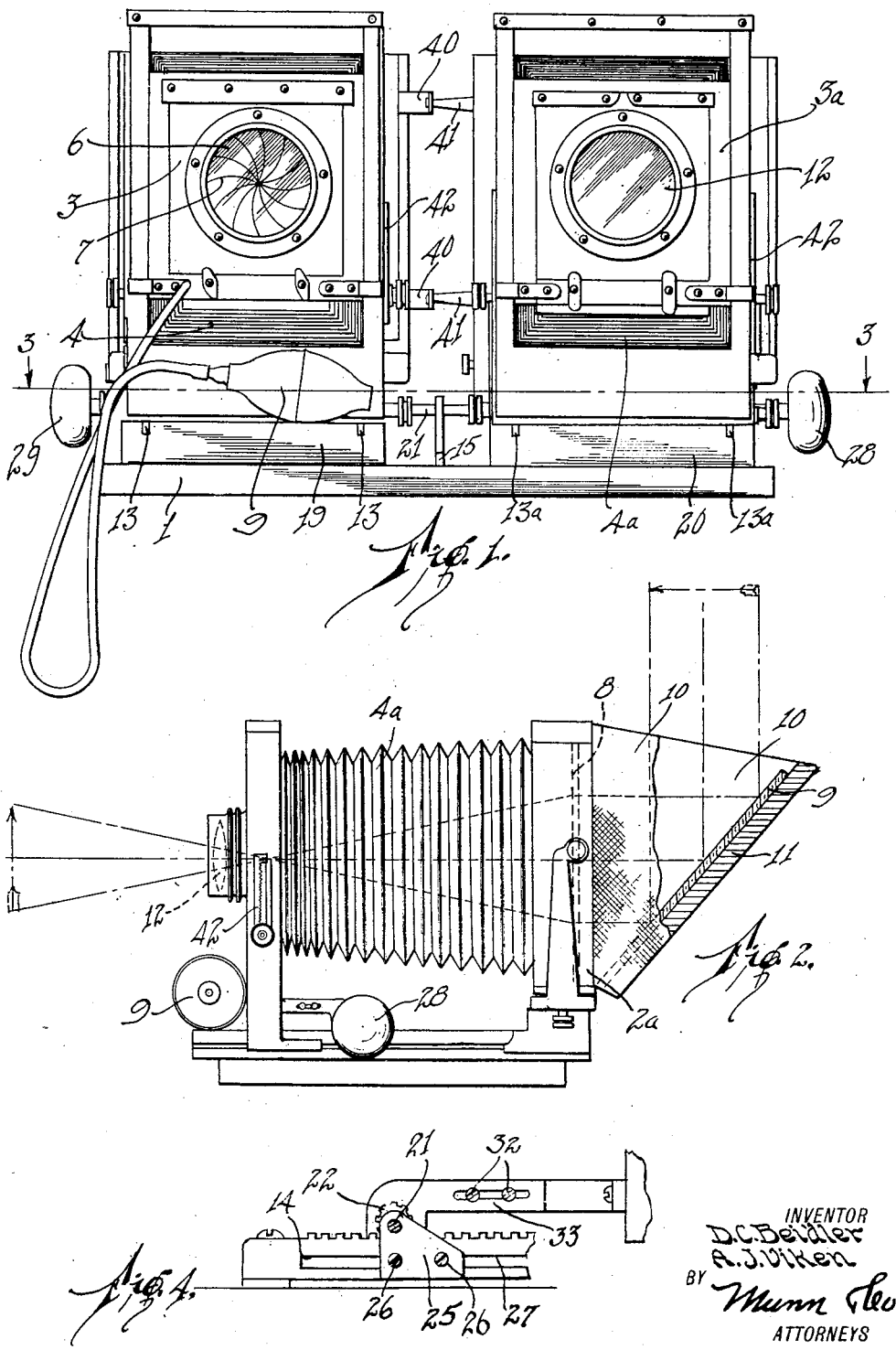

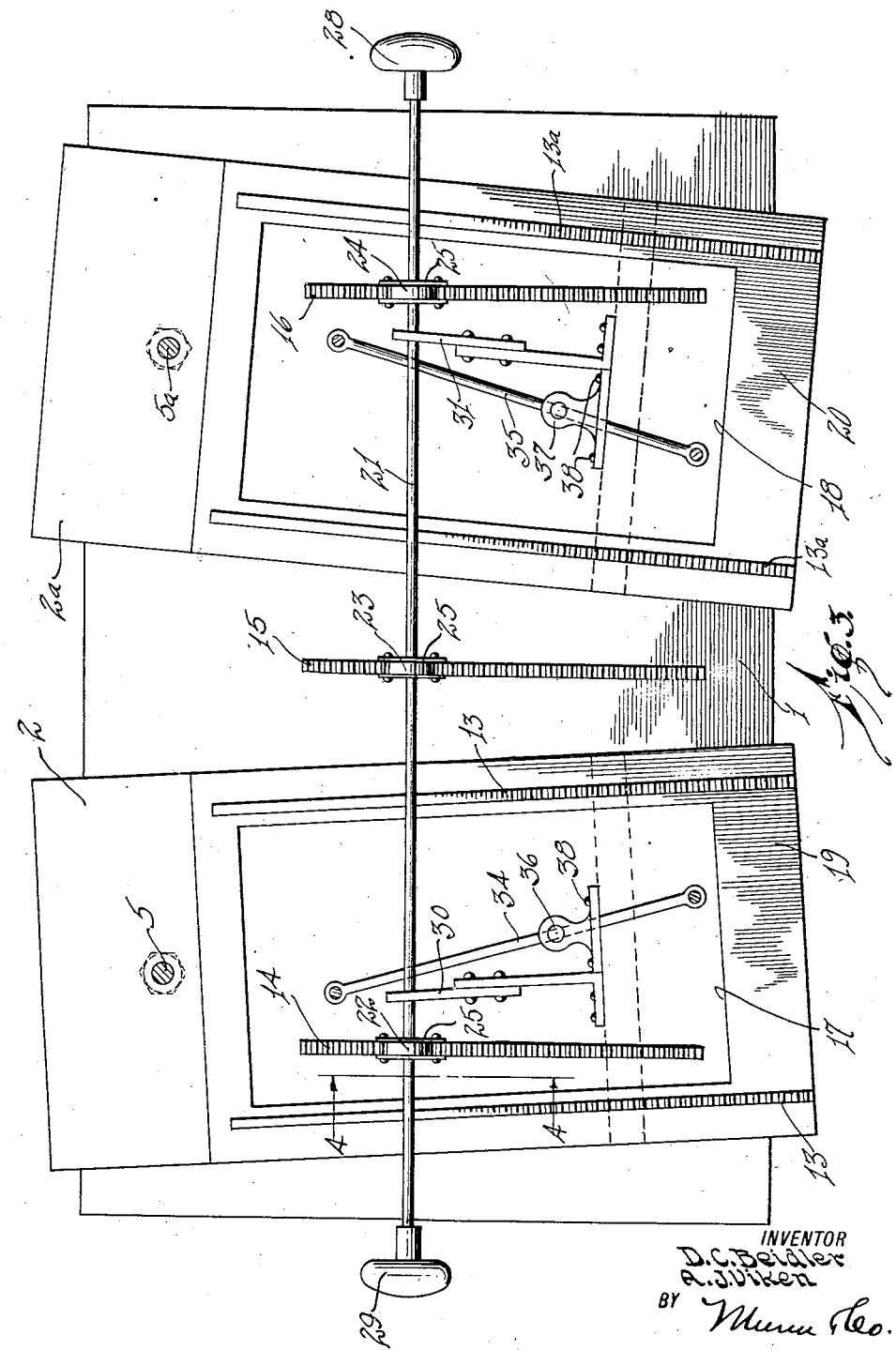

Patented Mar. 3, 1925.

1,528,464

UNITED STATES PATENT OFFICE.

DONALD CAMERON BEIDLER AND ANTONIUS JOHNSON VIKEN, OF CHICAGO, ILLINOIS.

PORTRAIT CAMERA.

Application filed November 17, 1923. Serial No. 675,356.

*To all whom it may concern:*

Be it known that I, DONALD CAMERON BEIDLER, a citizen of the United States, and ANTONIUS JOHNSON VIKEN, a citizen of Norway (having declared my intention of becoming a citizen of the United States), both residents of Chicago, in the county of Cook and State of Illinois, have invented a new and useful Improvement in Portrait Cameras, of which the following is a full, clear, and exact description.

Our invention relates to improvements in portrait cameras and it consists in the combinations, constructions, and arrangements herein described and claimed.

An object of our invention is to provide a camera of the character described by means of which portraits of small children may be taken without the necessity of posing the subject and having the subject hold that pose until the camera may be made ready for the exposure. It is well known that in the ordinary type of portrait camera, the camera is first used as a view camera to focus the subject during the process of posing. When this process is completed it is then necessary to place a film or plate held in the holder in front of the ground glass of the camera, whereupon the exposure may be made.

A further object of our invention is to provide a camera of the type described in which a view camera and a camera equipped for taking pictures are simultaneously operated by a single control so that their lenses may be focused simultaneously and so that the cameras are moved upon their pivotal supports as the bellows are extended or contracted in such a manner as to cause the axial line of each lens to cross on the same plane in which the lenses are focused. The meaning of the word "focus" is here confined to movement of the lens to or from the plate holder or ground glass, as the case may be.

A further object of our invention is to provide a device of the type described by means of which a subject may be observed through the view camera at the very time the exposure is made, thereby making certain that the focusing of the camera at the time of the exposure is correct.

A further object of our invention is to provide a device of the type described which is simple in construction, easy to operate, not likely to become out of order, and thoroughly practical commercially.

Other objects and advantages will appear in the following specification, and the novel features of the invention will be particularly pointed out in the appended claims.

Our invention is illustrated in the accompanying drawings forming part of this application, in which—

Figure 1 is a front elevation of an embodiment of our invention,

Figure 2 is a side elevation of the mechanism illustrated in Figure 1,

Figure 3 is an enlarged view along the line 3—3 of Figure 1, and

Figure 4 is a sectional view along the line 4—4 of Figure 3.

In carrying out our invention we make use of a platform 1. This platform may be such a platform as shown and described as the camera supporting member in our co-pending application on adjustable stand for cameras, Serial No. 657,357, filed November 17, 1923. A pair of cameras, each having box portions 2 and $2^a$ respectively, lens frames 3 and $3^a$ respectively, and bellows 4 and $4^a$ respectively placed between the box portions and the lens frames, are pivotally mounted at their box portions 2 and $2^a$ respectively upon the platform 1 by means of pivot pins 5 and $5^a$ respectively. The box portion 2 is equipped for reception of a standard plate holder in which the ordinary photographic film or plate may be placed for exposure, and the lens frame 3 is equipped with a lens 6 having a shutter 7 operated by a pneumatic bulb 9 precisely as in the ordinary type of studio camera. The box portion $2^a$ has a ground glass 8 (see dotted lines in Figure 2), in place of the plate holder structure, and a mirror 9 inclined at 45° from the ground glass 8, and provided with opaque webbing 10 at the openings on each side of the mirror 9, intermediate the box portion $2^a$ and the mirror. The mirror 9 is supported upon a suitable rigid back 11, and is arranged to be removed from the box portion $2^a$ at will. A lens 12 is carried by the lens frame $3^a$ and has the same focal characteristics as the lens 6. The lens 12 is not provided with a shutter, but is arranged to be open at all times, since obviously the camera of which the lens 12 is a part is not intended for taking pictures, but is merely a view camera.

The cameras, as set forth, consist of photographic cameras, and are of the type in which the entire lens frames 3 and 3ᵃ may be moved toward and away from their box portions 2 and 2ᵃ upon the racks 13 and 13ᵃ respectively.

Our present invention consists chiefly in the provision of the mechanism by means of which these two cameras may be simultaneously focused, i. e., the lens frames 3 and 3ᵃ may be simultaneously moved to and away from the box portions 2 and 2ᵃ carrying the film or plate holder and the ground glass 8 respectively, and also in which the entire cameras may be pivoted upon their pivotal frames 5 and 5ᵃ toward or away from one another, as the frames 3 and 3ᵃ are moved away or toward the box portions 2 and 2ᵃ respectively.

The mechanism by means of which we accomplish this novel result comprises three racks 14, 15, and 16, parallel to one another and supported upon the upper surface of the platform 1. The racks 14 and 16 are disposed so that they may lie within the openings 17 and 18 respectively, through the bed plates 19 and 20 of the frames 3 and 3ᵃ respectively.

A shaft 21 disposed transversely to the racks 14, 15, and 16 is provided with three pinions, one for each of the racks 14, 15, and 16. These pinions are numbered 22, 23, and 24, respectively. In reference to Figure 4, it will be noted that the pinions are in mesh with the teeth of the racks and that a guide member 25 is provided consisting of a pair of parallel plates having bolts 26 projected therethrough which lie in a slot 27 extending longitudinally of the racks. This structure assures the constant engagement of the pinions with the racks so that rotation of the shaft 21 by such means as a hand grip 28 or 29, one of which is disposed at each end of the shaft, may cause movement of the shaft 21 laterally.

In order that rotation of the shaft 21 may occasion the advance or reverse movement of the frames 3 and 3ᵃ, adjustable members 30 and 31 are secured to the frames 3 and 3ᵃ respectively. These members 30 and 31, as reference to Figure 4 will show, are provided with adjusting screws 32 which project through slots 33 in one-half of the divided portion of the members 30 and 31 so that the length of these members may be varied at will. The outermost ends of the members 30 and 31 are provided with openings therethrough, through which the shaft 31 is projected so that movement of the shaft 21 may occasion a like movement of the members 3 and 3ᵃ.

In order to bring about the pivotal movement of the cameras upon their supports 5 and 5ᵃ in such a manner as to cause the axial lines of the lenses 6 and 12 to cross in that plane upon which the cameras are focused, we provide a pair of slide rods 34 and 35 secured to the platform 1 and inclined toward one another at their outermost ends. The angle of inclination of the slide rods 34 and 35 is accurately predetermined, and is that angle which is incident to the crossing of the axial lines of the lenses 6 and 12 respectively in the plane upon which the lenses are focused.

A pair of slide members 36 and 37 are slidably received upon the rods 34 and 35 respectively, and fixed by means of rivets 38 or the like to the innermost sides of the lens frames 3 and 3ᵃ of the cameras.

The box portions 2 and 2ᵃ of the cameras so formed are hingedly secured to one another by means of a pair of spring clips 40 carried by the box portions 2 and 2ᵃ and having their outer ends in engagement with a pair of finger-like members 41 which engage with the outermost ends of the clips 40 in such a manner as to permit the hinged movement of the box members 2 and 2ᵃ relative to one another.

In practice we find it best to incline the platform 1 where it is desired to raise or lower the focal point of the cameras; instead of using the standard elevation rack, as shown at 42 on the camera frames 3 and 3ᵃ, since such manipulation of the camera suffices for both of the cameras.

From the foregoing description of the various parts of the device, the operation thereof may be readily understood. Let us assume that the subject which is to be photographed is a subject particularly difficult to pose, such as a small child. In the ordinary type of camera, it is first necessary to adjust the camera and to focus the camera by means of a frosted glass or the like substituted for the plate holder. After this process is completed and the pose is satisfactory, then a plate holder having a sensitized plate therein is placed in front of the frosted glass. During this process of placing the plate holder with the plate in place, it is not uncommon to have the subject change his position or pose in such a manner as to utterly spoil the picture when taken.

In our improved camera, the photographer will look upon the mirror 9 and see a properly disposed image of the subject upright, and substantially as might be projected upon the sensitized film or plate in the camera box 2 if the shutter were operated. If the camera is not properly focused, the image viewed through the view camera will give evidence of this fact. The photographer will then manipulate the rod 21 so as to move the frames 3 and 3ᵃ simultaneously toward or away from the box portions 2 and 2ᵃ until the image is clear, and the camera is properly focused. He may then watch the subject through the view camera until the pose is precisely as it should be, whereupon the bulb may be operated to operate the shutter 7 and the picture thus taken should be precisely as the subject appeared through the view camera. No time will have been lost by placing a plate holder before the frosted glass, and in permitting the subject to change his pose.

The primary purpose of the clip 40 and the finger members 41 in their connection with the box portions 2 and 2ª of the camera is to permit the simultaneous tilting of the box portions. This tilting of the box portions simultaneously is necessary to obtain a sharp image where the entire cameras are tilted and are pointing downwardly or upwardly.

Our improved camera is most efficiently operated by having an assistant to do the focusing, and thus leave the photographer free to give all of his attention to the posing and lighting of the subject.

We claim:

1. The combination with a photographic camera and a view camera, each having a lens, the rear portions of said cameras being pivotally supported at a fixed distance from one another, of means for moving said cameras on their pivotal supports away from and towards each other as the lenses of said cameras are moved towards and away from the plate holder and view glass of the photographic camera and view glass camera respectively.

2. The combination with a photographic camera and a view camera, the rear portions of said cameras being pivotally mounted at a fixed distance from one another, and each having a lens, and means for moving the lenses of said cameras toward and away from their plate holder and view glass respectively, of means associated with said first named means for moving said cameras on their pivotal supports simultaneously with the movement of said lenses.

3. The combination with a photographic camera and view camera, the rear portions of said cameras being pivotally mounted at a fixed distance from one another, each of said cameras being equipped with a lens, and means for simultaneously moving their lenses towards or away from the plate holder or view glass respectively, of means associated with said first named means for moving said cameras on their pivotal supports so that the axial lines of the lenses of said cameras may cross in that plane upon which the cameras are focused by virtue of their movement toward or away from the plate holder or view glass respectively.

4. In a device of the character described, a pair of cameras having their rear portions pivotally supported at a fixed distance from one another, a control adapted for manual operation for moving the lenses of said cameras, and other means associated with said first named means for moving said cameras towards or away from each other on their pivotal supports as the lenses are moved by said first named means.

5. The combination with a photographic camera and a view camera, each having a lens, said cameras being movably mounted with respect to each other, of means for moving the forward portions of said cameras with respect to each other effectively to retain their focal axes on a common object while maintaining their focal lengths equal to each other, substantially as described.

6. The combination with a photographic camera and a view camera, each having a lens, said cameras being movably mounted with respect to each other, and being capable of having their focal lengths varied, of means for varying the focal lengths equally, and means for simultaneously maintaining the focal axes of both cameras on a common object while retaining their rear portions substantially a fixed distance apart, substantially as described.

7. The combination with a photographic camera and a view camera, each having a lens, and each being capable of movement to vary its focal length and the direction of its focal axis, of means for simultaneously varying the focal lengths and the directions of the focal axes of said cameras without substantially varying the separation of their image planes effectively to maintain the focal axes of both cameras on a common object while equally varying the focal lengths, substantially as described.

8. The combination with a photographic camera and a finder therefor, said finder having a variable focal length, of means for varying the focal axes of both the camera and the finder and for simultaneously varying the focal length of the finder correspondingly with variation of the focal length of the camera and without substantially varying the separation of the focal axes at the points where they intersect their respective image planes, effectively to maintain the focal axes of the finder and camera on a common object on which the focal lengths are momentarily equalized, substantially as described.

9. The combination with a photographic camera and a finder therefor, said finder having a variable focal length, of means for at all times maintaining the focal axes of the camera and finder on a common object while varying the focal lengths of the finder and camera equally and without substantial variation of separation of their image planes, substantially as described.

10. The combination with a photographic camera having a variable focal length and a variable focal axis, of a finder therefor also having a variable focal length and a variable focal axis, and means for at all times maintaining the focal axes of the camera and finder on a common object and the separation between said focal axes substantially unchanged at the points where they intersect their respective image planes while varying the focal lengths of these two elements, substantially as described.

11. The combination with a photographic camera having a variable focal length and a variable focal axis, of a finder therefor also having a variable focal length and a variable focal axis, and means for at all times maintaining the focal lengths and focal axes of these two elements in coordination while simultaneously varying them without substantial variation of the separation of the focal axes at the points where they intersect their respective image planes, substantially as described.

12. The combination with a photographic camera having a variable focal length and a variable focal axis, of a finder therefor also having a variable focal length and a variable focal axis, and means for maintaining the focal points of both of these two elements on a common object while varying the focal length or axis of one of the elements and without substantial variation of the separation between the focal axes at the points where they intersect their respective image planes, substantially as described.

13. The combination with a photographic camera having a variable focal length and a variable focal axis, of a finder therefor also having a variable focal length and a variable focal axis, and means for at all times co-ordinating the focal lengths and focal axes of these two elements without substantial variation of the separation between the focal axes at the points where they intersect their respective image planes, substantially as described.

14. In a device of the class described, the combination of a platform, a photographic camera and a finder therefor each having a variable focal axis pivotally mounted on said platform, to swing about vertical axes, and means for simultaneously swinging both of said elements about their respective axes including a horizontal shaft lying transversely of the platform, and means on one end thereof for rotating said shaft, substantially as described.

15. In a device of the class described, the combination of a platform, a photographic camera and a finder therefor each having a variable focal axis pivotally mounted on said platform, to swing about vertical axes, and means for simultaneously swinging both of said elements about their respective axes including a horizontal shaft lying transversely of the platform, substantially as described.

DONALD CAMERON BEIDLER.
ANTONIUS JOHNSON VIKEN.